INVENTOR
Kurt ROCHLA
ATTORNEYS

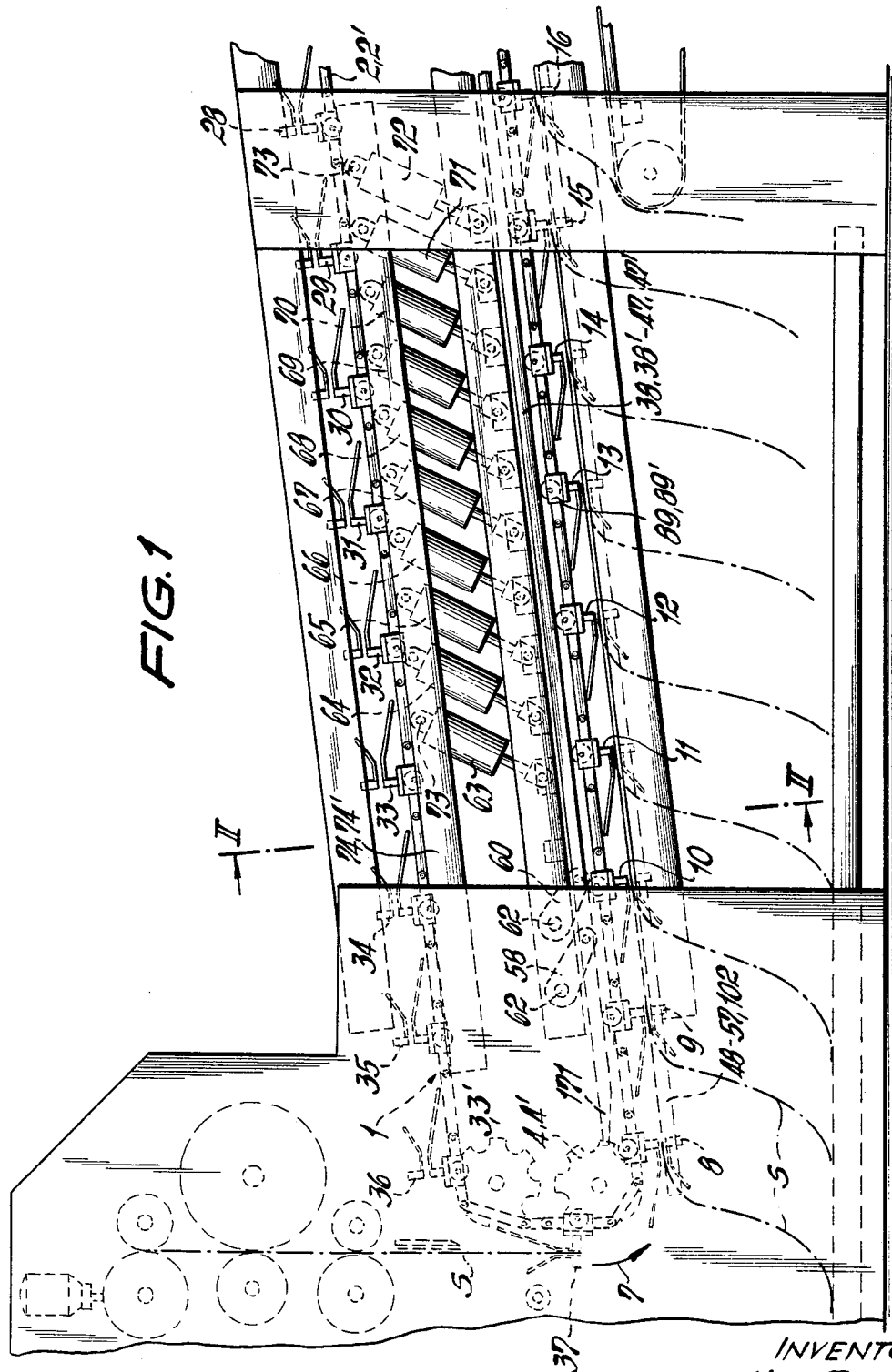

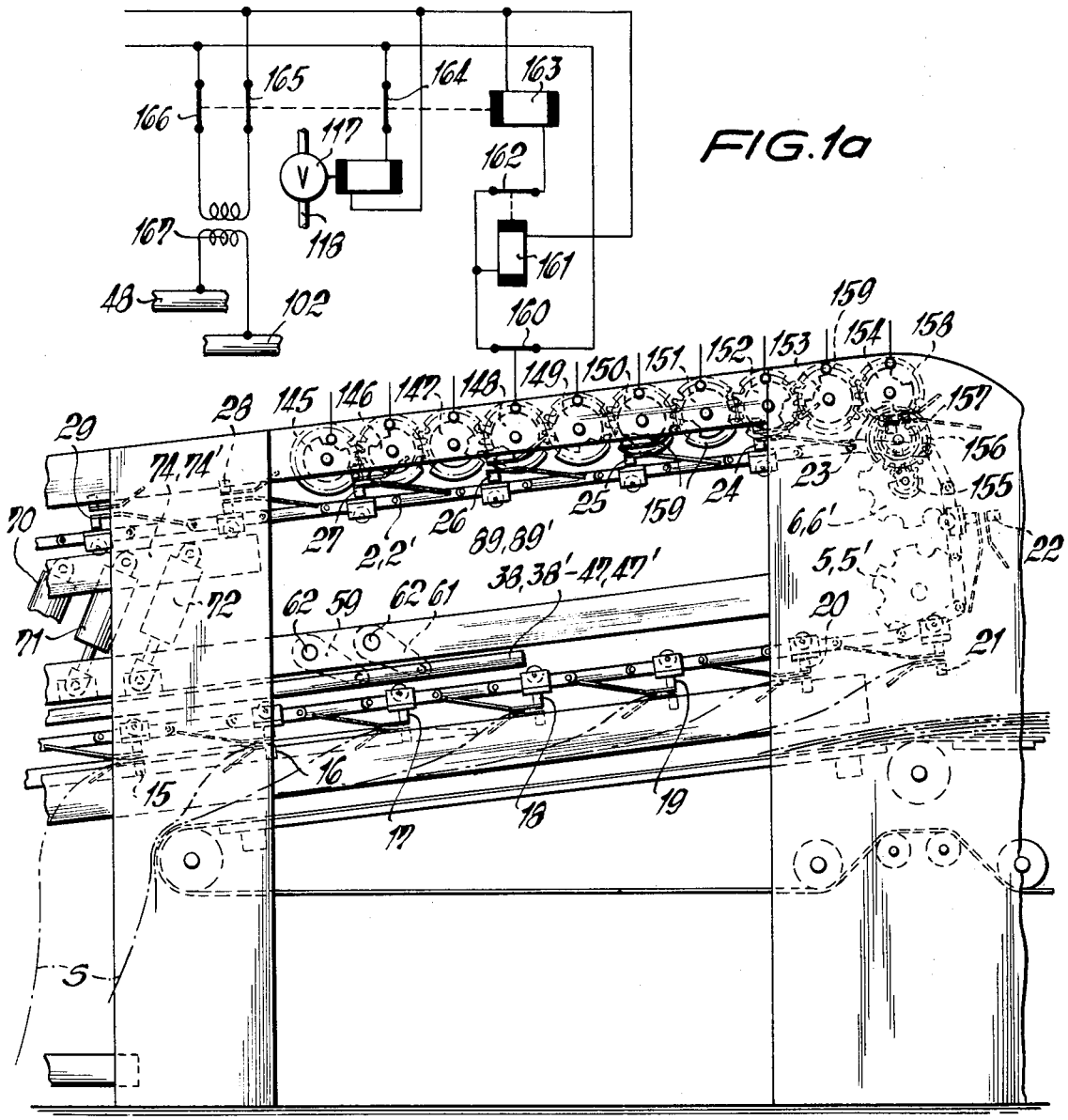

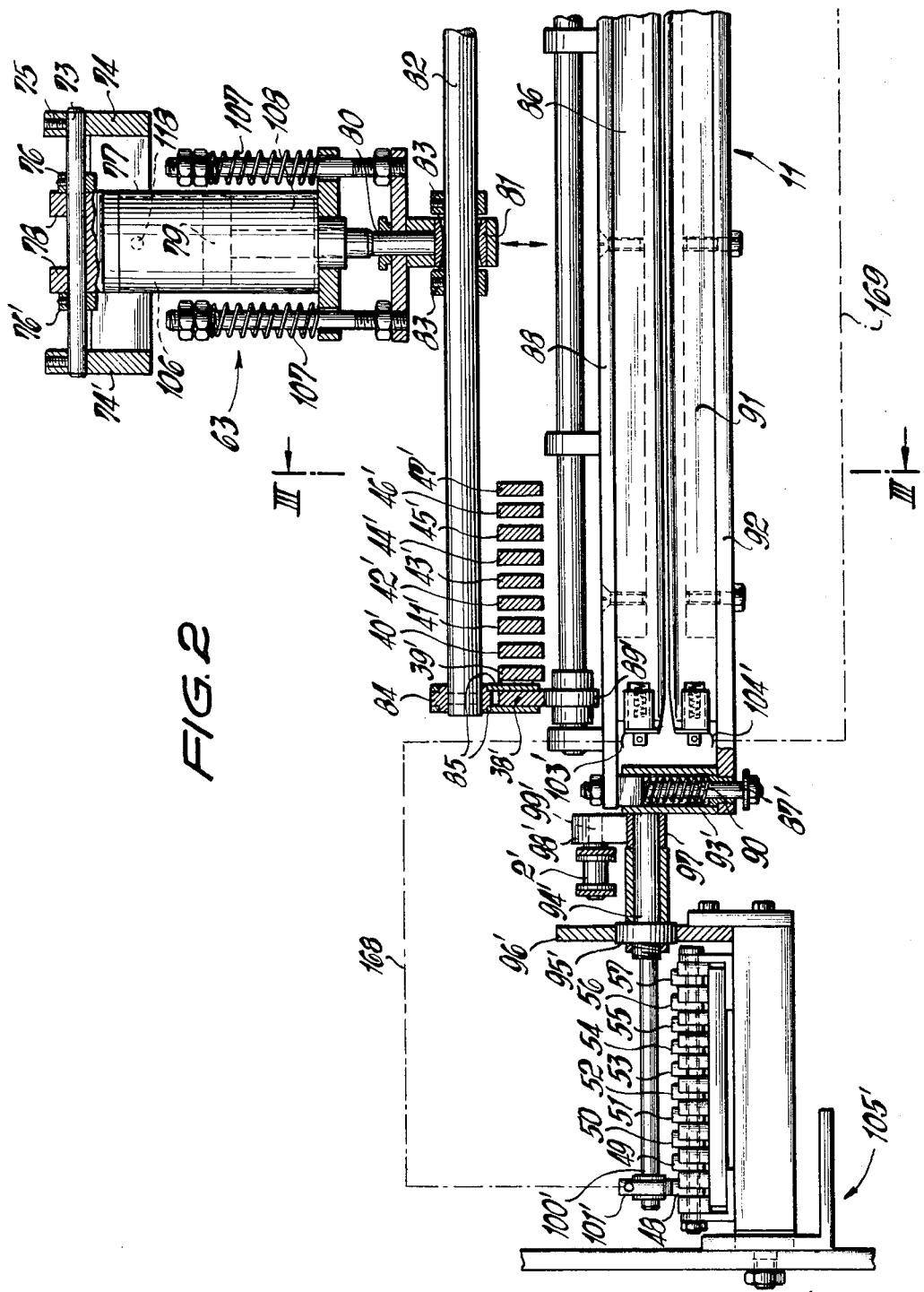

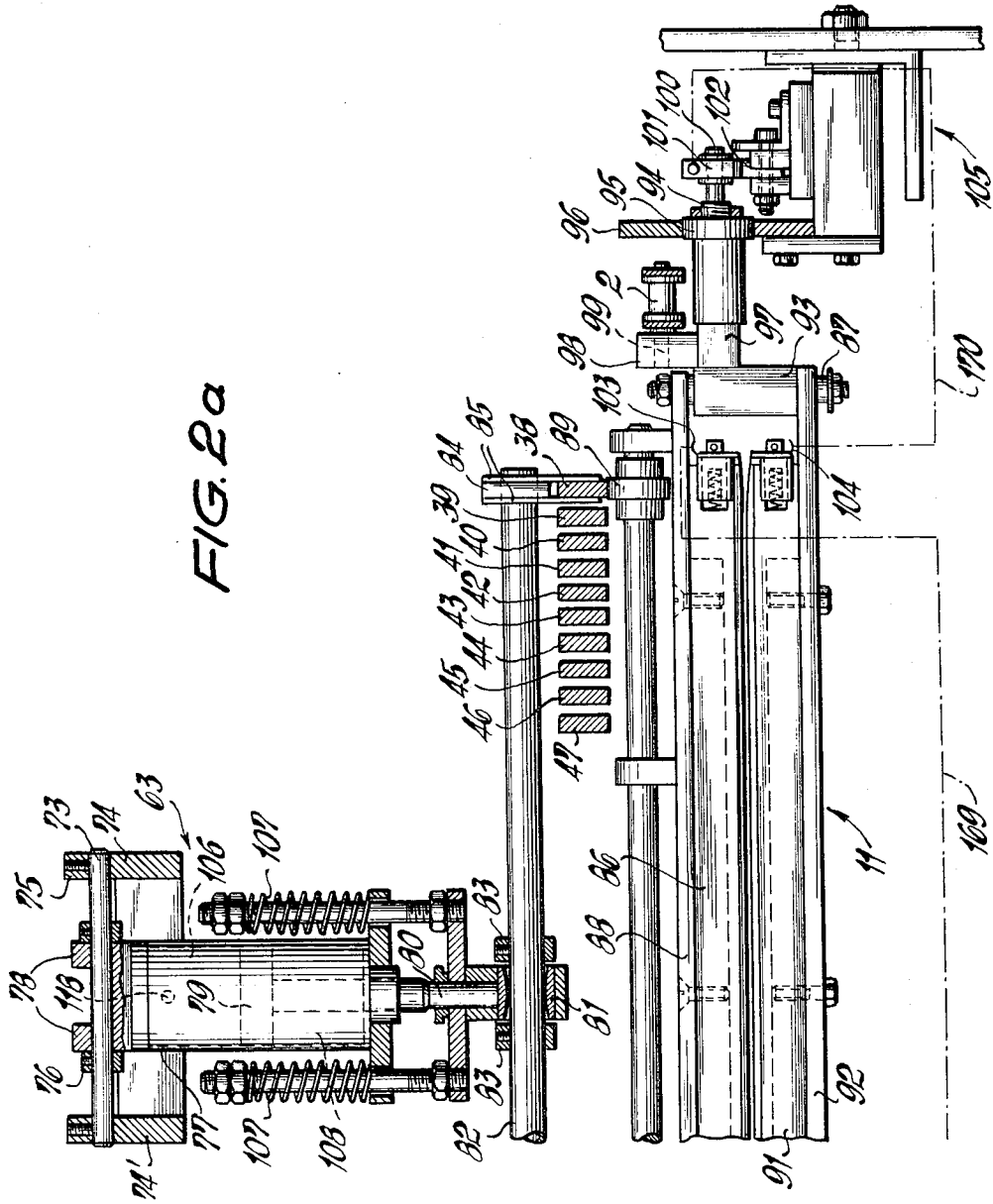

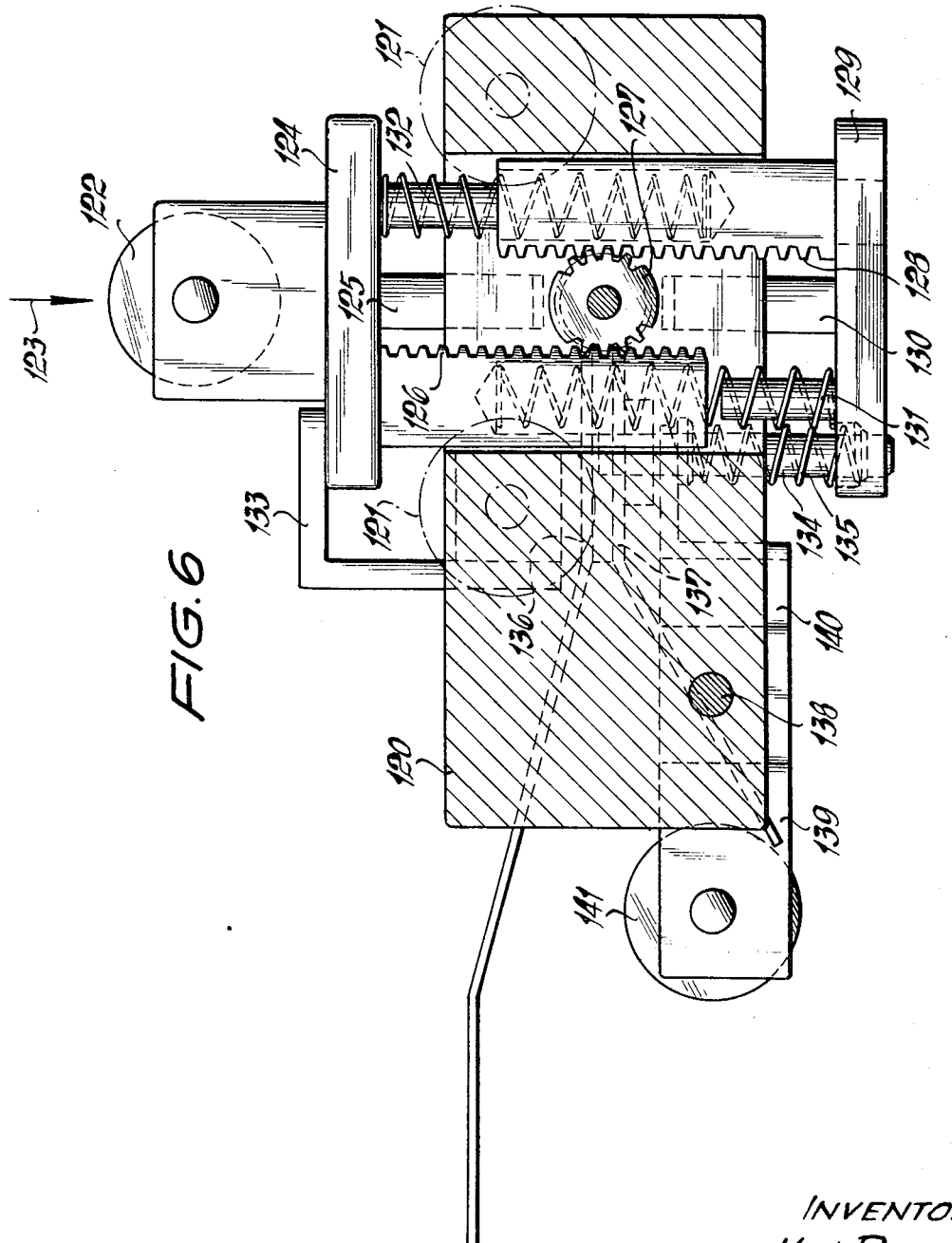

United States Patent Office 3,579,407
Patented May 18, 1971

3,579,407
MACHINE FOR HEAT SEALING CONTINUOUSLY MOVING WORK-MATERIAL SHEETING IN THE MANUFACTURE OF BAGS OF PLASTICS MATERIALS
Kurt Rochla, Lengerich, Westphalia, Germany, assignor to Windmoller & Holscher, Westphalia, Germany
Filed Aug. 15, 1968, Ser. No. 752,930
Claims priority, application Germany, Aug. 18, 1967, W 44,584
Int. Cl. B30b 15/34; B32b 31/20
U.S. Cl. 156—583
19 Claims

ABSTRACT OF THE DISCLOSURE

A plurality of heat sealing jaw sets are secured to endless conveyor chains and revolve at the velocity of the workpieces. A plurality of said heat sealing jaw sets are in action simultaneously. The heat sealing set is adapted to be energized in dependence on the machine cycle and to be de-energized by means of a timing element after a predetermined interval of time.

---

This invention relates to a machine for heat sealing continuously moving workpieces, preferably tube sections, of plastics material sheeting in the manufacture of bags of plastics materials, which machine comprises a plurality of heat sealing jaw sets which are secured to endless conveyor chains and revolve at the velocity of the workpieces.

Such machines have been provided in numerous designs in order to avoid in the manufacture of products of plastics material sheeting, above all in the manufacture of bags of plastics materials, an intermittent conveyance and processing because such intermittent operation would increase the wear of the apparatus and would not permit of the high output rate by which the present-day-high-duty machines are distinguished.

In connection with the heat sealing of the end portions of bags made of coated paper, it was disclosed in the U.S. patent specification No. 2,106,740 as early as 1938 to provide heating and pressing tools, which are carried by upper and lower chains, and to maintain said tools in contact with annularly extending busbars so as to maintain the tools at elevated temperature in this case, the duration of the action on the workpieces depends on the length of the processing line and the machine velocity.

In connection with the manufacture of bags having an open filling end and a lower end that is closed by a heat-sealed seam from endless tubing of plastics material, the French patent specification No. 1,182,240 has disclosed a process in which sections corresponding to the length of the bag are initially severed from endless tubing and are then transferred to a revolving chain conveyor, which carries heat sealing sets assemblies for heat sealing one end of each tube section. The heat sealing operation is performed while the two jaws of each of two heat sealing sets move jointly in the mutually confronting courses of the two chain conveyors.

In another machine, which is known from the German patent specification No. 1,060,585, the heat sealing sets are arranged on a rotor and are heated in a certain sector of their circular orbit. Another known machine according to the French patent specification No. 1,378,102 comprises heat sealing sets, which are moved along a straight line and heated over a certain distance by means of a busbar. The length of the busbar is adjustable to enable an adaption to the material to be heat-sealed and the velocity of the machine.

It is finally known from the U.S. patent specification No. 2,984,288 to heat the heat-sealing sets during their return travel.

In all above-mentioned known machines for heat sealing continuously moved workpieces of plastics material sheeting, the time of the application of the sealing heat depends on the time which is required by the heat sealing tools to traverse a certain conveyance path section, e.g., the length of the busbar disclosed in the French patent specification No. 1,378,102 or the length of the heating section according to the United States patent specification 2,984,288. Because the length of the current supply path or heating path is selected in view of the requirements of the machine during normal operation, rejects due to defective heatseals will necessarily be obtained during the start-up and shut-down of the known machines because under these operating conditions too much sealing heat is supplied to the sheeting as the welding time is much prolonged so that the sheeting is not only plasticized but liquefied or even evaporated. For the same reasons, defective heatseals will be obtained if the working speed varies for some reason or other during normal operation. The machine speed depends on numerous factors, inter alia, on the material which is being processed and the size of the product. For this reason, it is difficult and undesirable to operation at a specific machine speed. The adjustment of the length of the busbar in dependence on the machine speed, which has been selected and must then be exactly maintained, involves additional setting-up work and does not succeed in avoiding the considerable amounts of rejects produced during the start-up and shut-down and when the machine speed differs from the set value.

These disadvantages of the known machines which comprise a plurality of heat sealing jaw sets that are in action simultaneously are eliminated in accordance with the invention in that the heat sealing set is arranged to be energized in dependence on the machine cycle and to be de-energized by means of a timing element after a predetermined interval of time. As a result, the beginning of the heat-sealing time depends on displacement when the heat sealing jaw set has reached the correct position in the machine but the termination of the heat sealing time is dependent on time rather than on the machine cycle so that the heat sealing time has always the same adjusted optimum value irrespective of the machine speed. It is thus ensured that satisfactory heatseals are produced during a start-up and shut-down as well as during a fluctuation of the machine speed and during operation at all other machine speeds which can be selected in accordance with the other working conditions.

It will be desirable if, in a further embodiment of the invention, a separate supply busbar is provided for initiating and terminating the supply of the heat sealing current to each of the heat sealing jaw sets that are simultaneously in the heat sealing path and the circuit of each supply busbar includes a delay line. Alternatively, a timing element might be provided between the current collector of each heat sealing jaw set and its heat sealing tool so that a single busbar can be used, which is continuously energized. It will be desirable if the timing elements consist of time limit relays.

The total number of the revolving heat sealing jaw sets is suitably an integral multiple ($n$) of the heat sealing jaw sets which are in the heat sealing path at the same time, if these sets have respective supply busbars associated with them. Hence, when there are $x$ heat sealing jaw sets in the heat sealing path at a time, this proposal of the invention calls for the provision of $nx$ heat sealing jaw sets on the revolving endless conveyors, $n$ being an integer. In this case, each busbar is utilized $n$ times during each revolution. For instance, when there are ten heat sealing sets in the heat sealing path at the same time and the revolving conveyor elements carry a total of thirty heat sealing sets, the first, eleventh and twenty-first heat sealing sets will use one and the same busbar, the second, twelfth and twenty-second heat sealing assembly will use the second busbar, etc. For this reason the total number of busbars that are required is not as large as the total number of heat sealing sets but is equal to the number heat sealing sets that are in the heat sealing path simultaneously.

Because the total number $(nx)$ of heat sealing sets is an integral multiple $(n)$ of the heat sealing sets $(x)$ which are in action at the same time, each busbar will be used $n$ times during each total revolution with a uniform timing. This has the advantage that each busbar may have associated with it a control cam, which is driven by the machine and which performs $n$ revolutions during a total revolution of the conveyor and closes the heat sealing circuit in dependence on displacement when the current collector of the corresponding heat sealing set has engaged the busbar. This will avoid the formation of sparks when the engagement of the current collectors is initiated so that the life of the current collectors and busbars will be increased. At the same time, the control cam energizes the time limit relay, which will open the heat sealing circuit after the predetermined heat sealing time, independently of displacement.

If the machine operates at a very high speed and a very long heat sealing time has been set, it may be necessary to open the heat sealing circuit before the respective current collectors disengage their busbars. To ensure this, the control cam opens the circuit shortly before the current collector disengages its busbar unless the time limit relay has opened the circuit at this time. This means, however, that the present heat sealing time is shortened so that rejects might be produced. For this reason, it is another feature of the invention to produce automatically an audible or visual signal in order to direct the operator's attention to the undesired condition of operation.

According to another proposal of the invention, drive cams or rails for controlling the opening and closing movements of the movable heat sealing jaws may be provided in a number which corresponds to the number of the heat sealing jaw sets which are in action at the same time, and these cams or rails may be movable at right angles to the plane in which the workpieces travel and serve to actuate each of the heat sealing jaws which are simultaneously in the heat sealing path. The heat sealing jaws must be opened at the same time when it is desired to produce so-called shrunk seams. If the heat sealing jaws remained closed when the heating circuit has been opened in dependence on time, a burning or an excessive weakening of the sheeting in the heat sealing station would be prevented but a shrinking of the material would be prevented, too.

The operation of each drive cam for initiating the heat sealing operation is suitably initiated by the same control cam which closes the heating circuit and controls the time limit relay. If the shrinking should begin immediately when the heat sealing time has expired, the opening movement of the heat sealing jaws may be initiated by the same time limit relay which opens the heating circuit. If a seam that has been greatly thickened by shrinking is not desired, the opening movement of the heat sealing jaws may be initiated by respective separate time limit relays, which may be adjusted so that the heat sealing jaws are opened a desired adjustable interval of time after the opening of the heating circuit so that a restricted shrinkage may be produced because the seam has previously cooled down to a larger or smaller extent.

If the current is supplied continuously through a single busbar, the de-energization of the heat sealing jaw sets in dependence on time, in accordance with the invention, may be effected only by the disengaging movement of the drive rails although this will obviously be less desirable than the described closing and opening of the heat sealing circuit.

Because the adjustment is the same for all heat sealing operations, each time limit relay for opening the heat-sealing circuit and, if desired, for initiating the opening movement of the heat sealing jaw, or any of the separate relays for initiating the opening movement, may be respectively adjustable by common potentiometers so that the duration of the heating pulses and, if desired, the duration of the application of afterpressure, may be adjusted by respective setting knobs during the operation of the machine.

According to the invention, the drive cams may consist of straight rails, which are associated with respective pairs of levers for adjusting the rails parallel to themselves, and which are provided with an adjusting device. It is suitable to provide for each heat sealing jaw set two drive rails, which are disposed on opposite sides of the conveyor line and act on the heat sealing jaw at both ends thereof. The drive unit may suitably consist of a cylinder-piston unit, which is actuated hydraulically or preferably pneumatically under control of solenoid valves and acts on the middle of a beam, which bears on both individual rails. As a result, the same contact pressure will be applied by both individual rails. The use of a cylinder-piston unit for producing the contact pressure has the advantage that the contact pressure is independent of deformations and structural inaccuracies as the predetermined pressure prevails regardless of the position of the piston. Besides, the contact pressure can be very easily adjusted.

In accordance with another proposal of the invention, the pairs of drive rails are symmetrically disposed with respect to the center line of the invention are nested one into the other with a rail spacing which decreases from each pair to the next. To minimize the distance between the drive rails lying one beside the other on each side of the machine, the levers pivoted to the ends of the rails and serving for the parallel motion of the rails and for the adjustment of the rails may be arranged in alternate positions on adjacent rails. The cylinder-piston units for respective pairs of drive rails are suitably arranged one behind the other in the center plane of the machine because it makes no difference for the pivotal movement of the pairs of drive rails what point of the length of the pair of rails the force is applied.

It will normally be sufficient if one heat sealing jaw is movable by the drive means. To produce an entirely satisfactory heat-sealed seam, it may be desirable in accordance with another proposal of the invention to arrange for oppositely directed movements of both heat sealing jaws apart from each other so that both heat sealing jaws lift from the plasticized sheeting and the same can shrink without disturbance on both sides.

In the following description, the invention will be explained more fully with reference to the drawing, which shows embodiments by way of example.

FIG. 1 is a partly diagrammatic side of elevation of the machine according to the invention.

FIG. 2 is an enlarged sectional view taken on line II—II of FIG. 1 and showing a pair of heat sealing jaws together with drive means and current supply means.

FIG. 6 is an enlarged sectional view similar to that of FIG. 3 and showing a heat-sealing and retaining jaw according to another embodiment of the invention.

Figure 3:
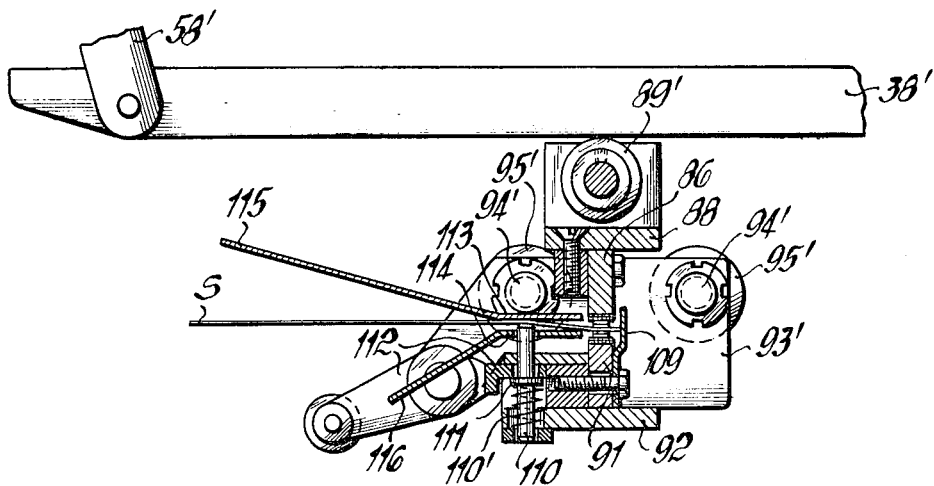
FIGS. 3 to 5 are transverse sectional views taken on line III—III in FIG. 2 and showing a heat sealing and retaining jaw in three different conditions.

The embodiment of the machine shown by way of example in FIG. 1 of the drawing is based on the disclosure of the prior German patent application W 41,664 VIIb/54b and constitutes a machine for making open bags of plastics material, which machine comprises a device for serving the incoming tubing of plastics material, and revolving endless carrying elements which carry spaced apart heat sealing jaw sets. In this machine, the spacing of the heat sealing jaw sets is much smaller than the length of the bags to be made, and the heat sealing jaw sets comprise means for retaining and feeding the bag workpieces, which during the heat sealing operation are held only at the end which is to be heat-sealed.

The machine comprises a revolving conveyor 1 (FIG. 1), which consists of two chains 2 and 2', (FIG. 2), which are disposed on opposite sides of the machine, trained each over four sprocket wheels 3 to 6 and 3' to 6' (FIG. 1), respectively, and adapted to be driven in the direction of the arrow 7.

Thirty heat-sealing and retaining tools 8 to 37 are secured to the conveyor 1. When the tools are in the position of the tool 37, they receive in accordance with the above-mentioned patent application sections S of plastics material which are supplied vertically from above. That end of said workpieces which has been received by the heat sealing and holding tool is to be closed by a heat-sealed seam.

The heat sealing operation begins when the heat sealing jaw sets supplied with workpieces have entered by the lower course of the conveyor 1, as is shown for the tool 8, and the tube sections S depend from the tools. The heat sealing operations may be continued until a total of ten tools, at most, have entered the heat sealing path. Ten pairs of drive rails 38, 38', to 47, 47' and ten busbars 48 to 57 (FIGS. 1 and 2) are provided for ten heat sealing tools which are disposed in the heat sealing path at a time. As a result, one pair of drive rails and one busbar are available for each heat sealing tool which enters the heat sealing path. These rails and this bar have just been left by the tool which leads the incoming tools by eleven heat sealing positions. When there are $x=10$ tools in the heat sealing path and a total of thirty tools, the rails are used by respective heat sealing sets $30:10=n=3$ times during each revolution of the conveyor so that the current supply to the busbars and the actuation of the drive rails for closing and opening the heat sealing jaws can be controlled irrespective of additional heat sealing sets, which may use the same bars and rails at the same time, as is the case in known machines, and with the timing required for optimum heat sealing conditions. In this case the speed of the machine is not significant, provided that it remains within the required limits.

For this reason, the drive rails 38 to 47' and the busbars 48 to 57 have such a length that two heat sealing sets, e.g., the sets 8 to 17, are in engagement with respective pairs of drive rails and respective busbars. Each of the drive rails 38–47' is pivoted to two levers 58 and 59 or 60 and 61, which are rotatably mounted on circular-section crossbeams 62 that are firmly mounted in the machine so that the rails 38–47' are movable parallel to themselves. The pairs of levers 58, 59 and 60, 61, which are not shown in FIG. 2, carry in alternation one rail each so that the rail spacing can be minimized. Ten piston-cylinder units 63–72 are provided to actuate the ten pairs of drive rails 38, 38' to 47, 47' and are articulated in the middle of the machine, e.g., at 73, and act each on one pair of drive rails, as is shown with more detail in FIG. 2.

Pins 73 are mounted in stationary rails 74, 74' (see also FIG. 1) and are held against rotation by screws 75. The cylinder 77 is rotatably mounted on the pins 73 exactly at the center of the machine between two set collars 76, 76' by means of two eyes 78. The piston 79 acts on a tubular beam 82 by means of the piston rod 80 and eye 81, which is secured to the piston rod 80 and has a cambered bore. Two set collars 83 hold the beam 82 against displacement in the eye 81. The ends of the beam 82 are received by bores in respective bushes 84, which have extensions on opposite sides; these extensions are received by the bores of straps 85. The latter are screw-connected to the drive rails 38 and 38' by means which are not shown. The rails 38, 38' are symmetrical with respect to the center line of the machine so that the beam 82 when loaded by the piston 79 exerts equal forces. Owing to the cambered bore of the eye 81, this will be ensured even if the drive rails 38, 38' are on different levels because the material to be heat-sealed varies in thickness across its width. Under the force exerted on them by the piston, the drive rails are displaced parallel to themselves because they are suspended from two links so that they are always at the same distance throughout their length from the lower course of the beam 1 and from the heat-sealing jaws.

The pair of drive rails 38, 38' act, e.g. on the pair of heat sealing tool 11. One heat sealing jaw 86 of said tool is removably guided by the pins 87, 87' and is adapted to be forced to the other heat sealing jaw 91 against the pressure of springs 90 by the drive rails 38, 38' and by rollers 89, 89', which are rotatably mounted on the base bar 88 of the tool. The other heat sealing jaw 91 is connected by the bar 92 to the jaw side members 93, 93', which contain the guides for the pins 87, 87', as shown. Each of the jaw side members 93, 93' carries two pins 94, 94' (see also FIGS. 3 to 5). Guide rollers 95, 95' are rotatably mounted on each of the pins 94, 94' and serve to guide the heat sealing tools between rails. Only the rails 96, 96' associated with one pair of pins 94, 94' are shown in FIG. 2 in a position which it assumes after a pivotal movement through 90° into the plane of the drawing. Straps 98, 98' are connected to each pair of pins 94, 94' by square members 97, 97', which are fitted on the pins. The straps 98, 98' and two extended chain pins 99, 99' of each of the two chains 2, 2' connect the heat sealing assembly to said chains.

As is shown in FIG. 2, each of the two pins 94, 94' has an extension 100 or 100', to which a current collector 101 or 101' is secured. The current collector 101 cooperates with the neutral bar 102, which is common to all heat sealing jaws, and the current collector 101' cooperates with the first busbar 48 of the ten busbars 48 to 57 to supply current to the pulse heating strips 103 and 104. The busbars are secured to and insulated from the side frames 105, 105' of the machine and have the length which is required for making contact with no more than ten heat sealing tools.

As is also shown in FIG. 2, the other pairs of drive rails 39, 39' to 47, 47' are nested and symmetrical with respect to the center line but the spacing of the two rails decreases from pair to pair. The length of the beams 82 associated with the nine further piston-cylinder units 64–72 decreases correspondingly from pair to pair.

When it is desired to close the heat sealing tool, compressed air is admitted to the upper cylinder chamber 106 through a solenoid valve 117 (FIG. 1) and the conduit 118 so that the piston 79 is lowered and by means of the drive rails 38, 38' and the rollers 89, 89' depresses the heat sealing jaw 86 against the pressure of the springs 90. At the same time, the compression springs 107 are stressed so that they return the piston 79 when the heat sealing operation has been terminated.

Alternatively, the springs 107 may be omitted and compressed air may be used also to return the piston. This compressed air is then admitted into the lower cylinder chamber 108 when the heat sealing operation has been terminated. That cylinder chamber which is not required at a time is connected to the outside atmosphere in known manner so as to enable an escape of the air.

Figure 4:
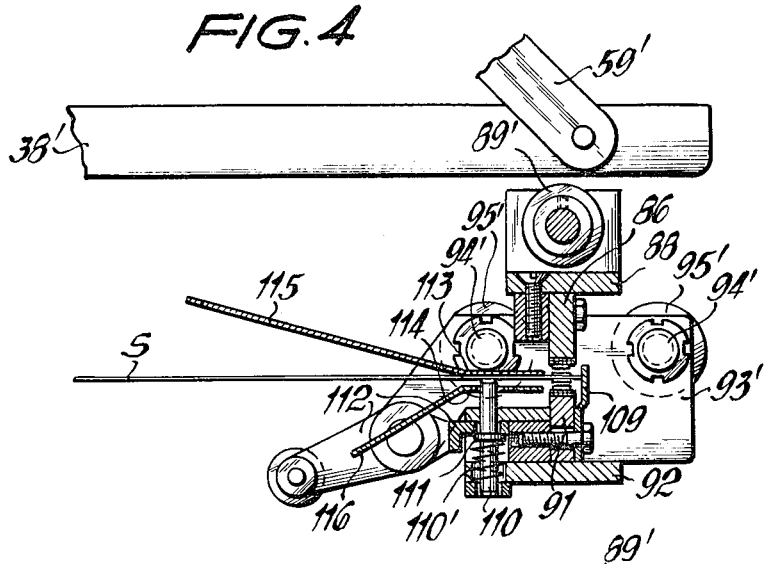
Figure 5:
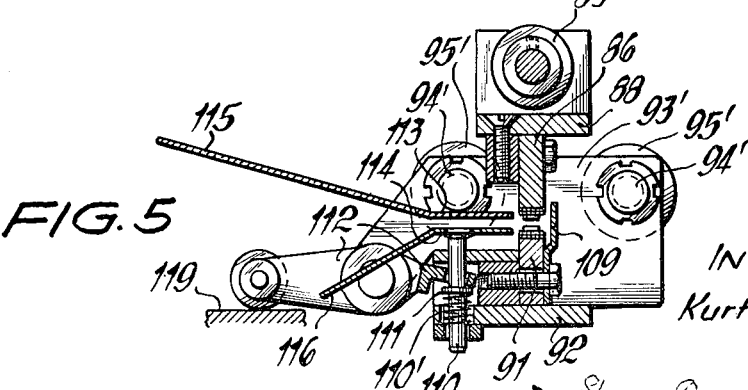

FIGS. 3 to 5 are transverse sectional views showing the heat sealing tool 86, 91. The same is shown in FIG. 3 in a closed position during the heat sealing period. In this position, the tube section S is still retained between the retaining jaws. FIG. 4 shows the heat sealing tool in an open position during the shrinkage period. FIG. 5 shows the tool when the retaining jaws have also opened and released the workpiece. In addition to the heat sealing jaws 86 and 91, a stop 109 is shown in FIGS. 3 to 5 and determines the position of the incoming workpiece. According to a prior proposal, the retaining jaws consist of individual pins, which are spaced across the width of the tool and loaded by compression springs 110' and provided with collars 111, which are engaged on one side by the compression springs and on the other side by a lever 112, which is controlled by stationary camwheels to lift or release the pins. The pins 110 cooperate with a backing plate 113 in gripping the tube sections S. To ensure that the tube sections will be received between the pins 110 and the backing plate 113, a guide plate 114 is provided below the backing plate 113 and formed with bores for receiving the pins. When the heat sealing and retaining jaw is open, as is shown in FIG. 5, the pins 110 do not protrude over the guide plate 114 so that the tube sections do not engage the pins but move as far as to the stop 109. The backing plate 113 and the guide plate 114 have outwardly directed extensions 115 and 116 forming funnel for receiving the workpieces.

In FIG. 3, the levers such as 59' are approximately vertical and the drive rail 38' closes the heat sealing jaw. In FIG. 4, the levers such as 59' have been pivotally moved and the rail 38 has been raised and has pivotally moved the levers such as 59' so that the heat sealing jaw 86 has been raised under the action of the springs 90 (FIG. 2). In FIG. 5, the heat sealing and retaining assembly has left the drive rails and has reached a stationary cam 119 so that the pins 110 have also been raised to release the workpiece.

In a transverse sectional view taken through a side member 120 corresponding to the side members 93, 93' of FIGS. 2 to 5, FIG. 6 shows a heat sealing and retaining assembly in which both heat sealing jaws can be lifted from the plasticized material. Guide rollers 121 corresponding to the guide rollers 95' are mounted on the side member and indicated with dash-and-dot lines. The actuating rollers 122 correspond to the rollers 89, 89'. As soon as pressure in the direction of arrow 123 is applied to the rollers 122 by a drive rail, not shown, the base plate 124 and one heat sealing jaw 125 are lowered. The base plate is connected to a rack 126, which is in mesh with a pinion 127 that is rotatably mounted in a fixed bearing in the side member 120 and imparts an oppositely directed movement to a second rack 128. The rack 128 is connected to a second base plate 129 for the other heat sealing jaw 130. The racks are guided in the side member 120 and are loaded by respective compression springs 131 and 132 in opposite directions so that they tend to open the heat sealing jaws. Angle members 133 prevent the two carriers for the heat sealing jaws from falling apart. The means for retaining the workpieces is similar to that of FIGS. 3 to 5 and comprises the pins 134, the compression springs 135, the backing plate 136, the guide plate 137 and the lever 139, 140, which is pivoted on the pin 138 and provided with the actuating roller 141 for raising and releasing the pins 134. The plasticized material no longer adheres anywhere when the two heat sealing jaws have been lifted so that the plasticized material can shrink without any obstruction and a particularly good heat-sealed seam of neat appearance is obtained as there are no impressions of a teflon-coated woven glass cloth.

The heat sealing operations are controlled by ten camwheels or control cams 145–154 (FIG. 1), which are driven from the shaft of the sprockets 6, 6' via a gear reducer 155–158 and further connecting gears 159 in such a manner that they perform one revolution relative to a fixed point during the passage of ten heat sealing jaws. As a result, the cams perform three revolutions during one entire revolution of a heat sealing jaw. Each camwheel closes and opens an associated switch, which is diagrammatically at 160 only for the camwheel 148. The switch 160 is closed to complete the circuit of a time limit relay 161. The closed switch 162 of the latter completes the circuit of another relay 163. The switch 164 of relay 163 completes the circuit of a solenoid valve 117. The switches 165 and 166 of the relay 163 permit of an application of voltage via transformer 167 between the common neutral bar 102 and the individual busbar 48. Compressed air has been admitted to the piston-cylinder unit 63 through the conduit 118 under control of the solenoid valve 117 so that the heat sealing tool 11 is closed. As has already been described with reference to FIG. 2, the heat sealing tool 11 is energized by means of the current collectors 101 and 101' and the leads 168, 169 and 170 shown in FIG. 2. The heating strips 103 and 104 are connected in series by a lead 169, which connects their ends 103' and 104'.

The camwheels 145–154 are so adjusted in the peripheral direction that the associated switch, such as 160, is closed at the time when the current collectors of the respective heat sealing tools have engaged the busbars. As the circuit of the respective busbar is not closed by the further relay until the switch has been closed, there will be no sparking. Such sparking would result if the current collectors would run up on busbars to which a voltage is already applied. The closing of the switch causes also an operation of the solenoid valve 117 to close the heat sealing tool. When the switch was closed, the associated time limit relay 161 was energized at the same time. When the set heat sealing time has expired, this relay opens its switch so that the further relay 163 is deenergized, the switches 164 to 166 are opened at the same time to interrupt the circuit and cause the heat sealing jaw to be opened. To de-energize the busbars when the machine operates at an excessive speed or when the time limit relay is set to an excessively long time before the current collectors have left the busbars, the camwheels open the switch, such as 160, before the current collectors leave the busbars. A break spark will thus be reliably avoided. The setting of the time at all ten time limit relays can be effected from a central position; this is not shown. When it is desired to maintain the heat sealing jaws closed even when the current is de-energized, special time limit relays and special further relays must be provided for the solenoid valves, such as 117, and these further relays are connected in parallel to the existing relays, such as 161 and 163.

Because more than ten heat sealing sets are never in action at the same time, it is sufficient to provide ten camwheels, ten switching devices with ten busbars, and ten drive rails with ten piston-cylinder units. When a heat sealing set has left these means, the latter can be used by a heat sealing set which follows eleven heat sealing sets behind. For this reason, three heat sealing sets are associated with each of the ten control devices and are regularly spaced around the periphery of the conveyor 1 so that all ten control devices are used three times in a cyclic sequence during each revolution. The drive rails 38 to 47' are beveled as at 171 at their receiving end so that the rollers such as 89, 89' do not strike against the rails when the rails are not moved pivotally upwardly owing to a failure of the piston-cylinder unit.

I claim:

1. Apparatus for heat-sealing continuously moving workpieces of plastic material, such as tube sections for the manufacture of bags of plastic material, comprising a plurality of heat-sealing jaw sets, said heat-sealing jaw sets being secured to endless conveyor chains revolving at the velocity of the workpieces through a heat-sealing path and an idle path, each of said heat-sealing jaw sets being arranged to be energized in dependence on the working cycle of said apparatus, a plurality of current supplying busbars corresponding to the number of heat-sealing jaw sets being in the heat-sealing path at a time, each of said busbars being associated with one of said heat-sealing jaw sets in said heat-sealing path, and circuit means comprising a timing element for de-energizing each of said heat-sealing jaw sets after a predetermined interval of time.

2. Apparatus according to claim 1 wherein the timing elements consists of time limit relays.

3. Apparatus according to claim 1 wherein the total number of the revolving heat-sealing jaw sets is an integral multiple of the heat-sealing jaw sets associated with the respective supply busbars which are in the heat-sealing path at the same time.

4. Apparatus according to claim 3 wherein each busbar has associated with it a control cam, said control cam being driven by the apparatus and revolving a designated number of times during a total revolution of the conveyor to close a heat-sealing circuit in dependence on displacement when a current collector of the corresponding heat-sealing jaw set has engaged the busbar.

5. Apparatus according to claim 4 wherein the control cam also energizes a time limit relay, said time limit relay opening the heat-sealing circuit after a predetermined heat-sealing time.

6. Apparatus according to claim 4 wherein the control cam opens a closed heat-sealing circuit before the current collector disengages its busbar.

7. Apparatus according to claim 6 wherein a signal is automatically produced upon an undesired condition of operation.

8. Apparatus according to claim 1 wherein drive cams for controlling the opening and closing movements of the heat-sealing jaws are provided in a number which corresponds to the number of the heat-sealing jaw sets which are in action, said cams being movable at right angles to the plane in which the workpieces travel.

9. Apparatus according to claim 8 wherein the operation of each drive cam for initiating the heat-sealing operation is initiated by a control cam which closes the heating circuit and controls a time limit relay.

10. Apparatus as claimed in claim 8 wherein the drive cams are pairs of drive rails.

11. Apparatus according to claim 1 including time limit relay means for opening the heat-sealing circuit and for initiating the opening movement of the heat-sealing jaw.

12. Apparatus as claimed in claim 11, wherein any of the separate relays for initiating the opening movement are respectively adjustable by potentiometers.

13. Apparatus according to claim 8 wherein the drive cams consists of straight rails, said straight rails being associated with respective pairs of levers for adjusting the rails parallel to themselves, and which are provided with an adjusting device.

14. Apparatus according to claim 13 wherein each heat-sealing jaw set has two drive rails, which are disposed on opposite sides of the conveyor, said drive rails acting on the heat-sealing jaw at both ends thereof.

15. Apparatus according to claim 13 wherein the drive cams consist of a cylinder-piston unit, controlled by a solenoid valve, said cylinder-piston unit acting on the middle of a beam, which bears on the individual rails.

16. Apparatus according to claim 10 wherein the pairs of drive rails are symmetrically disposed with respect to the center line of the apparatus with the spacing between two rails forming a pair decreasing from the outer pair to the inner pair.

17. Apparatus according to claim 16 wherein levers are pivoted to the ends of the rails to serve for the parallel motion of the rails and the adjustment of the rails, said levers being arranged in alternate positions on adjacent rails.

18. Apparatus according to claim 15 wherein the cylinder-piston units for respective pairs of drive rails are arranged one behind the other in the center plane of the machine.

19. Apparatus according to claim 8 wherein both heat sealing jaws perform oppositely directed movements apart from each other.

References Cited

UNITED STATES PATENTS

| | | | |
|---|---|---|---|
| 2,163,278 | 6/1939 | Hayes | 93—27 |
| 3,060,996 | 10/1962 | Rapisarda | 156—583 |

SAMUEL FEINBERG, Primary Examiner

J. J. DEVITT, Assistant Examiner

U.S. Cl. X.R.

156—510